(12) United States Patent
Srinivasa et al.

(10) Patent No.: US 6,608,910 B1
(45) Date of Patent: Aug. 19, 2003

(54) COMPUTER VISION METHOD AND APPARATUS FOR IMAGING SENSORS FOR RECOGNIZING AND TRACKING OCCUPANTS IN FIXED ENVIRONMENTS UNDER VARIABLE ILLUMINATION

(75) Inventors: Narayan Srinivasa, Moorpark, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/389,874

(22) Filed: Sep. 2, 1999

(51) Int. Cl.[7] ................................................. G06K 9/00
(52) U.S. Cl. ...................................... 382/100; 356/375
(58) Field of Search ................................ 382/100, 104, 382/154, 103, 278, 106; 340/436, 903, 540, 438; 359/843, 839, 872, 568; 356/375, 376, 139.03, 152.2

(56) References Cited

U.S. PATENT DOCUMENTS

| | | | |
|---|---|---|---|
| 5,398,185 A | | 3/1995 | Omura |
| 5,737,083 A | * | 4/1998 | Owechko et al. ............ 356/375 |
| 5,802,479 A | * | 9/1998 | Kithil et al. .................. 701/45 |
| 5,890,085 A | | 3/1999 | Corrado et al. |
| 6,005,958 A | | 12/1999 | Bruce et al. |
| 6,324,453 B1 | * | 11/2001 | Breed et al. .................. 701/45 |

FOREIGN PATENT DOCUMENTS

WO    WO 98/48372    10/1998

* cited by examiner

Primary Examiner—Jayanti K. Patel
Assistant Examiner—Seyed Azarian
(74) Attorney, Agent, or Firm—Tope-McKay & Associates

(57) ABSTRACT

An computer vision method and system for recognizing and tracking occupants in a fixed space under variable illumination. The system utilizes a camera to capture an initial image of the unoccupied fixed space and subsequently captures images of the occupied fixed space. The edge maps of the current estimate of the unoccupied fixed space including illumination variations and the occupied fixed space are computed. The edge map of the current estimate of the unoccupied fixed space is then subtracted from the edge map of the occupied fixed space to yield a residual edge map, which is then processed to extract the image of the occupant. At least one equivalent rectangle is then computed from the two-dimensional moments of the image of the occupant. The equivalent rectangles are then used to determine the occupant type and position and to track changes in real-time. This method and system is generally designed for use with automobile safety systems such as "smart" airbags. However, it may be tailored to many applications such as computer gaming, adaptive automotive controls, and "smart" homes, among others.

12 Claims, 7 Drawing Sheets

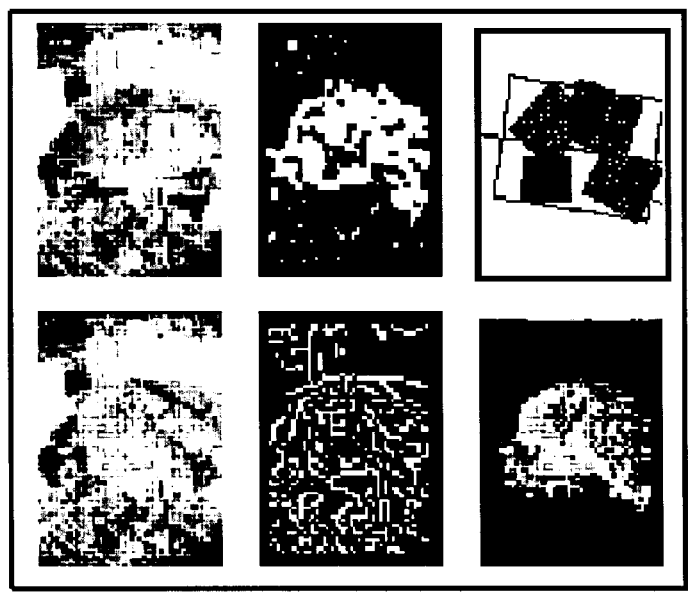
FIG. 4(a)
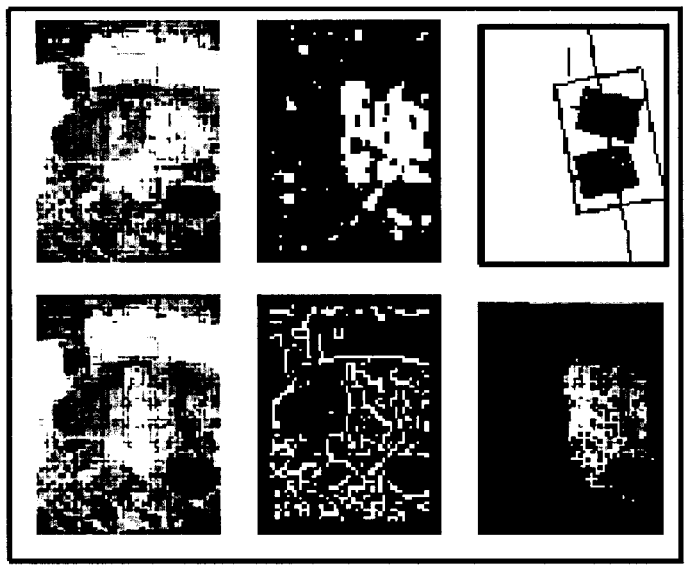
FIG. 4(b)
| 64x48 input image | Estimated background |
| --- | --- |
| Edge map | Extracted foreground image after edge dilation |
| Object mask after size filtering | 5 equivalent rectangles tracking foreground object |
FIG. 4(c)

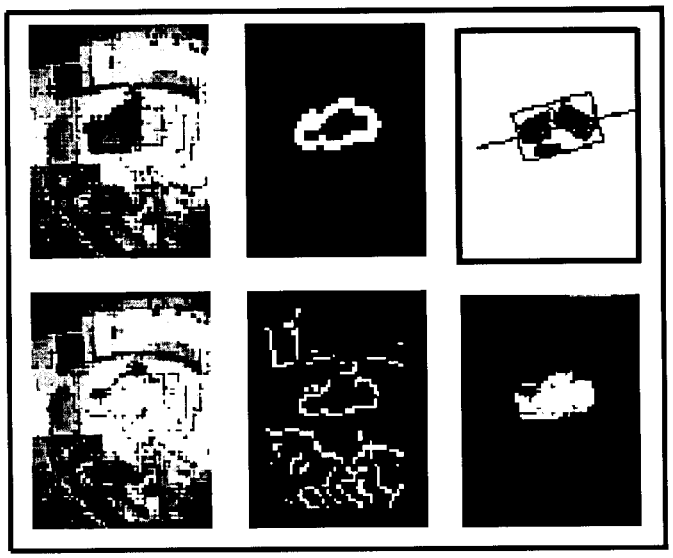
FIG. 5(b)
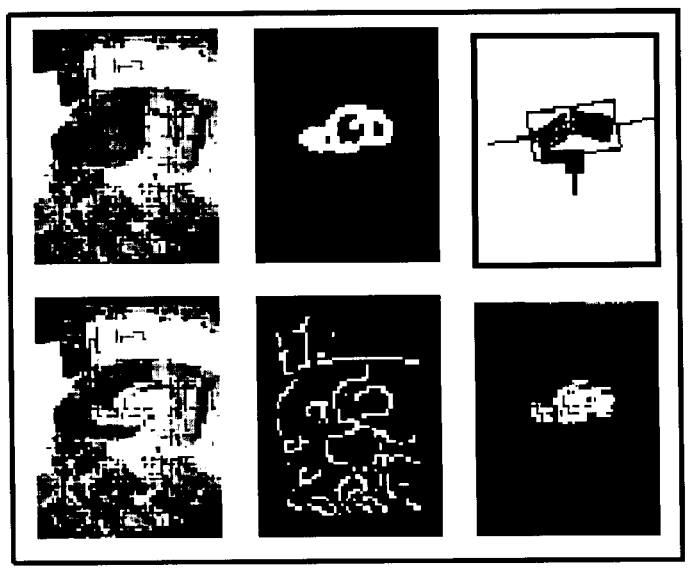
FIG. 5(a)
| 64x48 input image | Estimated background |
| --- | --- |
| Edge map | Extracted foreground image after edge dilation |
| Object mask after size filtering | 5 equivalent rectangles tracking foreground object |
FIG. 5(c)

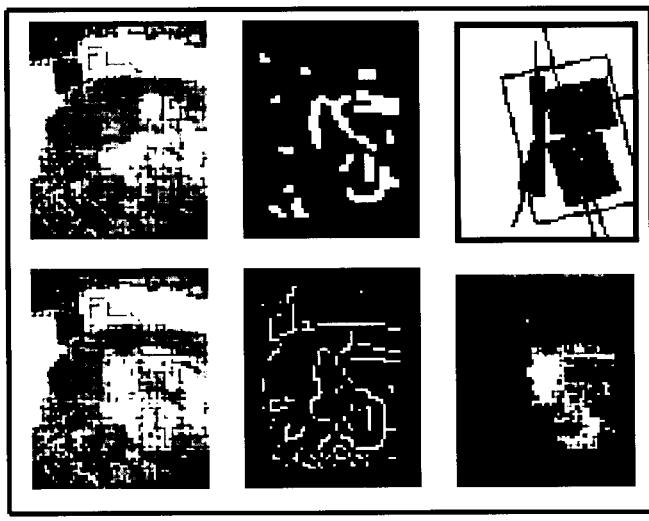
FIG. 6(a)
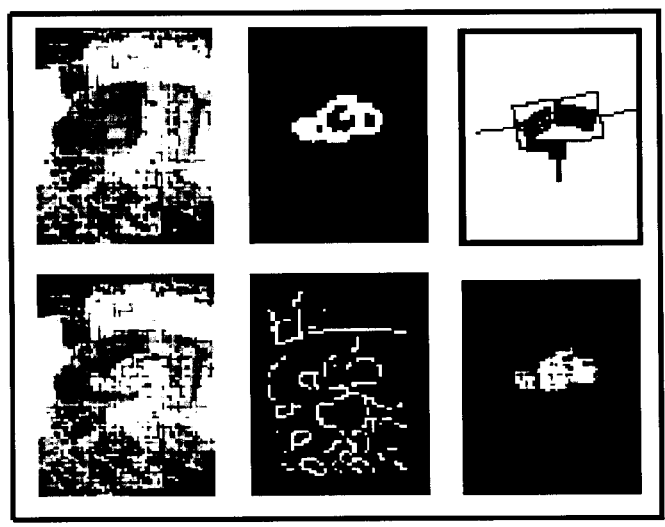
FIG. 6(b)
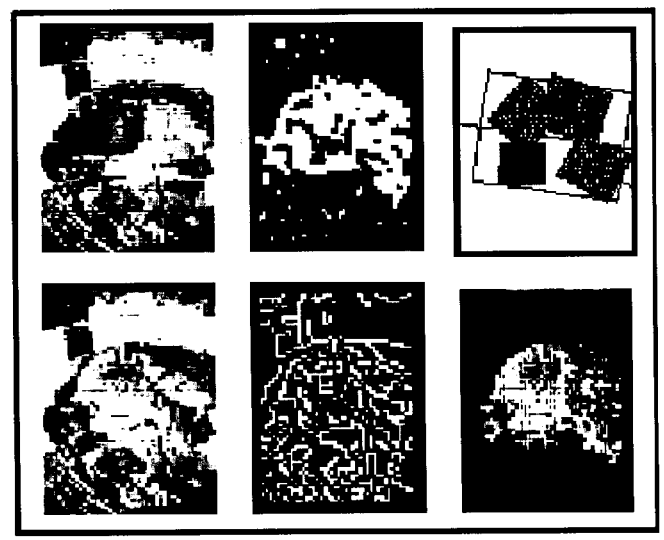
FIG. 6(c)
| 64x48 input image | Estimated background |
| Edge map | Extracted foreground image after edge dilation |
| Object mask after size filtering | 5 equivalent rectangles tracking foreground object |
FIG. 6(d)

COMPUTER VISION METHOD AND APPARATUS FOR IMAGING SENSORS FOR RECOGNIZING AND TRACKING OCCUPANTS IN FIXED ENVIRONMENTS UNDER VARIABLE ILLUMINATION

TECHNICAL FIELD

The present invention relates to systems for recognizing and tracking occupants in fixed environments under variable illumination conditions. In particular, the method disclosed herein is designed for use in sensing and tracking automobile occupants for "smart" airbag systems. Generally, however, the method may be adapted to a wide variety of uses involving motion sensing and tracking, such as gesture recognition for controlling and interacting with computers, computer gaming involving control via gestures and body positioning, "smart" home applications such as identification and tracking of occupants, and security systems to determine the identity of an occupant, among others.

BACKGROUND OF THE INVENTION

Conventional vehicle occupant safety systems typically utilize at least one mechanical, electromechanical, or electronic acceleration sensor fixed to the vehicle in order to sense acceleration. The sensor output is fed to a discrimination circuit for comparison with a predetermined threshold value. If the threshold value is exceeded, the discrimination circuit will send a signal to activate an occupant safety restraint device, such as an air bag or passive seat belt mechanism.

Conventional automotive crash detection systems based solely on accelerometer signals are not designed to account for variations in occupant type or position in determining whether to actuate a safety restraint device. Rather, these systems typically assume the existence of a nominal condition, such as the presence of an average male occupant without a seat belt. This assumption is designed to ensure proper actuation of the safety restraint device over a large range of possible occupant configurations when abrupt deceleration of the vehicle is detected by the accelerometer. Such an assumption, however, results in undesired actuation of the safety restraint device in over a wide variety of conditions, including for example, marginal crash situations where seat belt protection alone is sufficient, situations when the occupant is positioned such that actuation of the safety restraint device could cause injury, situations when the occupant type is inappropriate to warrant deployment of the safety restraint device (such as the case where the occupant is a rear-facing child seat), and in situations where no occupant is present.

Accordingly, there is clearly a need for an occupant sensing system that can tailor the actuation of a safety restraint device in a way that accounts for varying occupant conditions within a vehicle. For example, in cases where airbags are used as the safety restraint device, when an occupant is leaning forward toward the instrument panel there is a high risk of injury due to the force generated during airbag inflation. Even if the occupant is not too far forward at the beginning of the collision, the occupant will generally move rapidly forward relative to the interior of the vehicle. The occupant's head will tend to lead the occupant's body during this motion, and the occupant will move into the airbag deployment space as the vehicle rapidly decelerates. In this situation, the occupant will likely be injured by the impact of the inflating airbag. There are a number of factors that influence the forward motion of the occupant in addition to the initial position. These factors may vary markedly from one occupant to another, and include such variables as occupant size and type, whether the occupant has secured a seat lap belt and/or shoulder harness, whether and to what extent pre-impact braking (which tends to move the occupant forward relative to the interior) has occurred, and whether the occupant tenses during the collision. Also, variations in the crash intensity itself will cause considerable variation in occupant acceleration. Thus, there is a need for a system that provides reliable detection of the occupant type and position for analysis in making the decision whether, and how, to deploy an airbag.

When determining the occupant type, it is first important to determine whether the seat is occupied at all. Then, if it is occupied it is very important to classify the occupant in order to differentiate between various types of occupants such as large and small adults, children, and various child seats. Such information may be used to prevent deployment in undesirable situations, such as with a rear-facing child seat (RFCS) or when the seat is unoccupied. It can also be used to adjust the strength of the airbag deployment in accordance with the occupant's size and/or type. Any means for determining the type and position of an occupant must be highly reliable to properly tailor airbag deployment. In the case of a child seat, achieving reliability is especially difficult because there are over thirty-five different infant seat configurations available. Additional difficulty is created by the fact that car seats and other features of an automobile interior are adjustable. An effective occupant sensing system must be capable of providing reliable data sufficient for operation of both front and side deploying airbags.

Since conventional crash discrimination systems cannot detect the wide variety of occupant types and positions present in automobile crashes, they have not proven to be completely satisfactory. In response, the prior art has attempted to overcome these deficiencies by providing arrangements that are generally directed at detecting occupant presence, size, or position relative to some fixed structure in the vehicle. Following are a few examples of such prior art arrangements.

U.S. Pat. No. 5,398,185 to Omura discloses a system for optimizing deployment of occupant restraint devices which utilizes a combination of a plurality of seat sensors, a card reader for inputting data regarding the physical characteristics of the occupant, and two telecameras to compute a value characteristic of each interior vehicle element and the occupant's estimated behavior relative thereto.

U.S. Pat. No. 5,802,479 to Kithil provides a roof-mounted occupant position sensor array of capacitive coupling occupant position sensors, to determine position and motion of a occupant by analysis of distances of the occupant to the various sensors of the array and by analysis of the changes of these distances over time.

WO 98/48372 Published International Application to Farmer et al. discloses a method and system for detecting vehicle occupant type and position utilizing a single camera unit positioned, for example at the driver or occupant side A-pillar, to generate image data of the front seating area of the vehicle. The invention makes use of a 2-D grid in order to detect which regions of the grid are occupied and to compare the profile generated with stored profile data for a variety of occupant types to distinguish between occupant types such as forward or rear facing child seats, and occupants.

While these arrangements have provided an improvement over conventional crash discrimination systems, there still exists a need for a system which can tailor air bag deployment based on the specific type of occupant present in the vehicle, rather than utilizing broad categories based simply on occupant size. Furthermore, with the widespread use of air bags in motor vehicles, it has become apparent that with certain types of occupants, such as RFCS, airbags have a potential of causing more harm to the occupant than the crash itself. Therefore, deployment based on size alone is insufficient, and occupant type must also be specifically considered.

The prior art has attempted to distinguish infant seats from other occupants by using conventional distance measuring techniques to detect the amount and extent of possible occupant movement and by using weight-sensing arrangements to detect passenger weight. In either arrangement, threshold values are used to classify an object as either an occupant or an inanimate object. However, simply using weight sensors and/or movement monitoring has provided neither the level of discrimination needed between occupant types nor the reliability necessary to achieve "smart" control over air bag deployment. As a result, a need still exists for a system that can automatically and continually determine occupant type and position in a reliable and cost-effective manner.

SUMMARY OF THE PRESENT INVENTION

The present invention is directed to an apparatus and method that satisfies the need for a system that can automatically and continually determine occupant type and position in a reliable and cost-effective manner. A computer vision system for recognizing and tracking occupants in a fixed space under variable illumination conditions includes at least one sensor fixedly positioned to capture light reflected from a fixed space just prior to the entrance of an occupant to form an initial image of the unoccupied fixed space. After entrance of the occupant, the sensor continues to form images of the occupied fixed space at a desired sampling rate. The initial image and the subsequent images are compared in a processing subsystem to dynamically determine occupant type and position. Optionally, the system may include an artificial light source to aid processing during times when natural light is insufficient. The present invention may be modified via sampling rate, image resolution, and image partitioning to provide an accurate and reliable sensing system for applications including "smart" airbags, computer gaming, adaptive automotive controls, and "smart" homes, among others.

BRIEF DESCRIPTION OF THE DRAWINGS

FIG. 4a provides a visual representation of the results for occupant position detection for an adult in an upright position utilizing the equipment configuration of FIG. 1 and 2 with the algorithm of FIG. 3;

FIG. 4b provides a visual representation of the results for occupant position detection for an adult leaning close to the instrument panel in an automobile utilizing the equipment configuration of FIG. 1 and 2 with the algorithm of FIG. 3;

FIG. 4c provides a key to interpreting the images of FIG. 4a and FIG. 4b;

FIG. 5a provides a visual representation of the results for occupant recognition under normal lighting conditions utilizing the equipment configuration of FIG. 1 and 2 with the algorithm of FIG. 3;

FIG. 5b provides a visual representation of the results for occupant position detection under bright lighting, simulating sunshine, in front of the seat and utilizing the equipment configuration of FIG. 1 and 2 with the algorithm of FIG. 3;

FIG. 5c provides a key to interpreting the images of FIG. 4a and FIG. 4b;

FIG. 6 provides a visual representation of the results for occupant recognition demonstrating the detection of an adult in an upright position, a child in an upright position, and a rear-facing infant seat utilizing the equipment configuration of FIG. 1 and 2 with the algorithm of FIG. 3.

DETAILED DESCRIPTION

Figure 1:
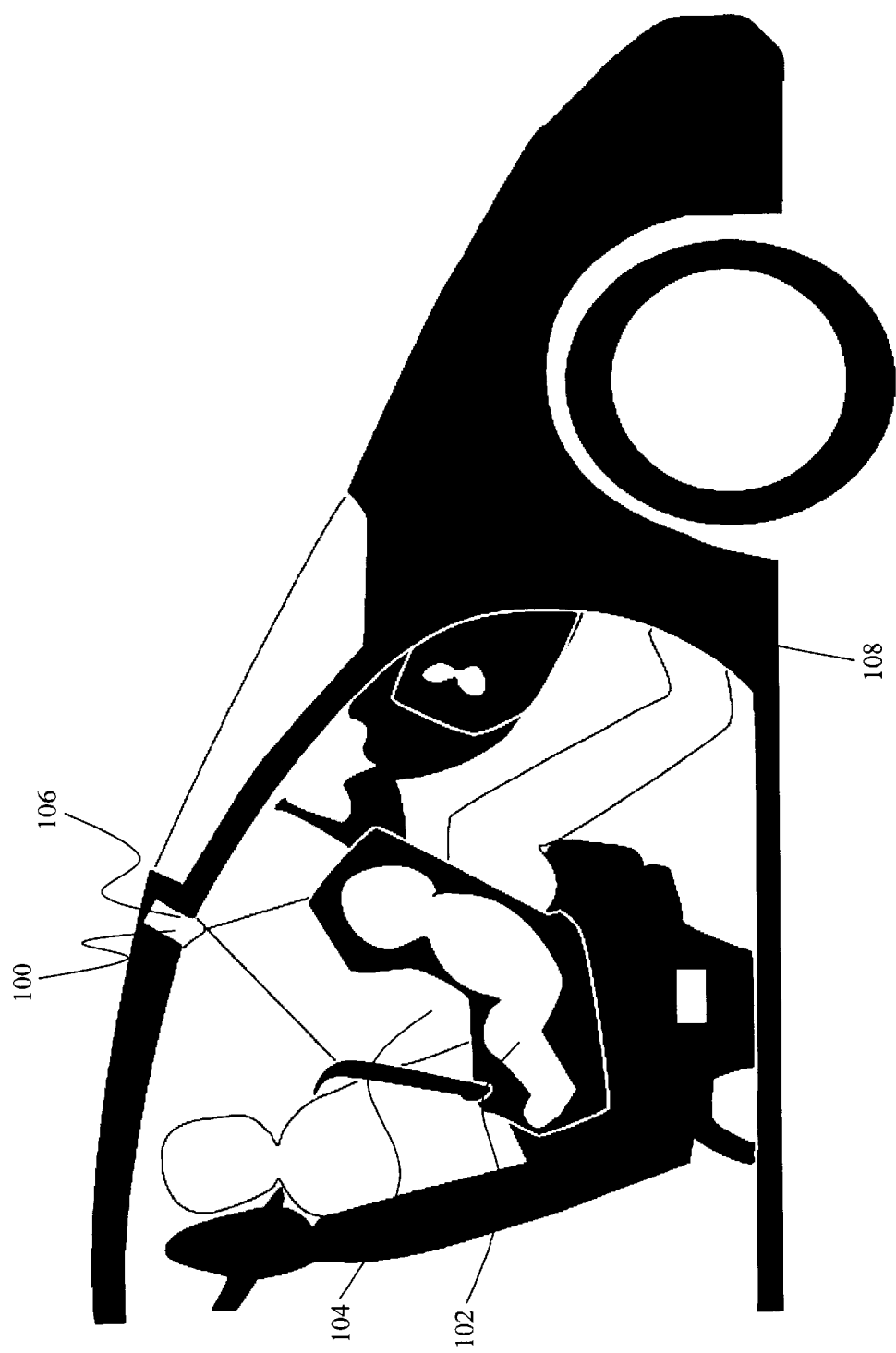
FIG. 1 is a cut-away side-view illustration of the present invention demonstrating the equipment configuration used with a seat of an automobile.

The computer vision system of the present invention includes at least one camera mounted at a fixed location inside of a fixed space such as the overhead console of an automobile near the rear-view mirror. Because the camera is fixed, it provides a fixed viewpoint of the occupant of the fixed space. The camera may be chosen to detect visible light or invisible light such as infrared (IR), and may, for example, take such forms as a CMOS imager, a charged couple device (CCD), or a thermal imager. FIG. 1 presents a cut-away side-view illustration demonstrating an equipment configuration that would be used with a seat of an automobile. As shown in the figure, the camera 100 is fixedly positioned to provide a field of view sufficient to "see" the occupant 102 of the fixed space 104. The camera 100 receives reflected light from the occupant 102 and the fixed space 104. Generally, ambient light is used to provide input to the camera. However, as shown in the figure, an illumination source 106, such as active IR LEDs and IR light bulbs, may be used in cases when the "natural" ambient light is insufficient. After receipt of input light to the camera 100, the light is converted to an electrical signal, which may be either analog or digital in form depending on the particular camera chosen, and is transferred to a processing subsystem 108. The processing subsystem 108, in turn, may provide output to various systems such as a "smart" airbag system, or other control systems within the automobile. Image processing may occur completely within the processing subsystem 108 or may be distributed between the camera 100 and the processing subsystem 108 depending on the particular equipment chosen. The camera 100 and processing subsystem 108 may be tailored for a particular image resolution and sample rate suited to a particular use. Furthermore, although demonstrated in the embodiment of FIG. 1 utilizing an automobile interior for the fixed space 104, other fixed spaces may be chosen depending on the particular application, examples of which include rooms with responsive systems in homes, computer games, etc. Further, depending on the selection of the desired image resolution and on the particular parameters used in the processing subsystem, embodiments of the invention may be adapted to provide data regarding occupant type and occupant movement, where the "occupant" may be defined abstractly as suited to the particular use. For example, in the case of gesture recognition, the "occupant" may be defined as a gesturing appendage, while in the case of automotive airbag systems, the "occupant" may be defined as the upper body of a person.

Figure 2:
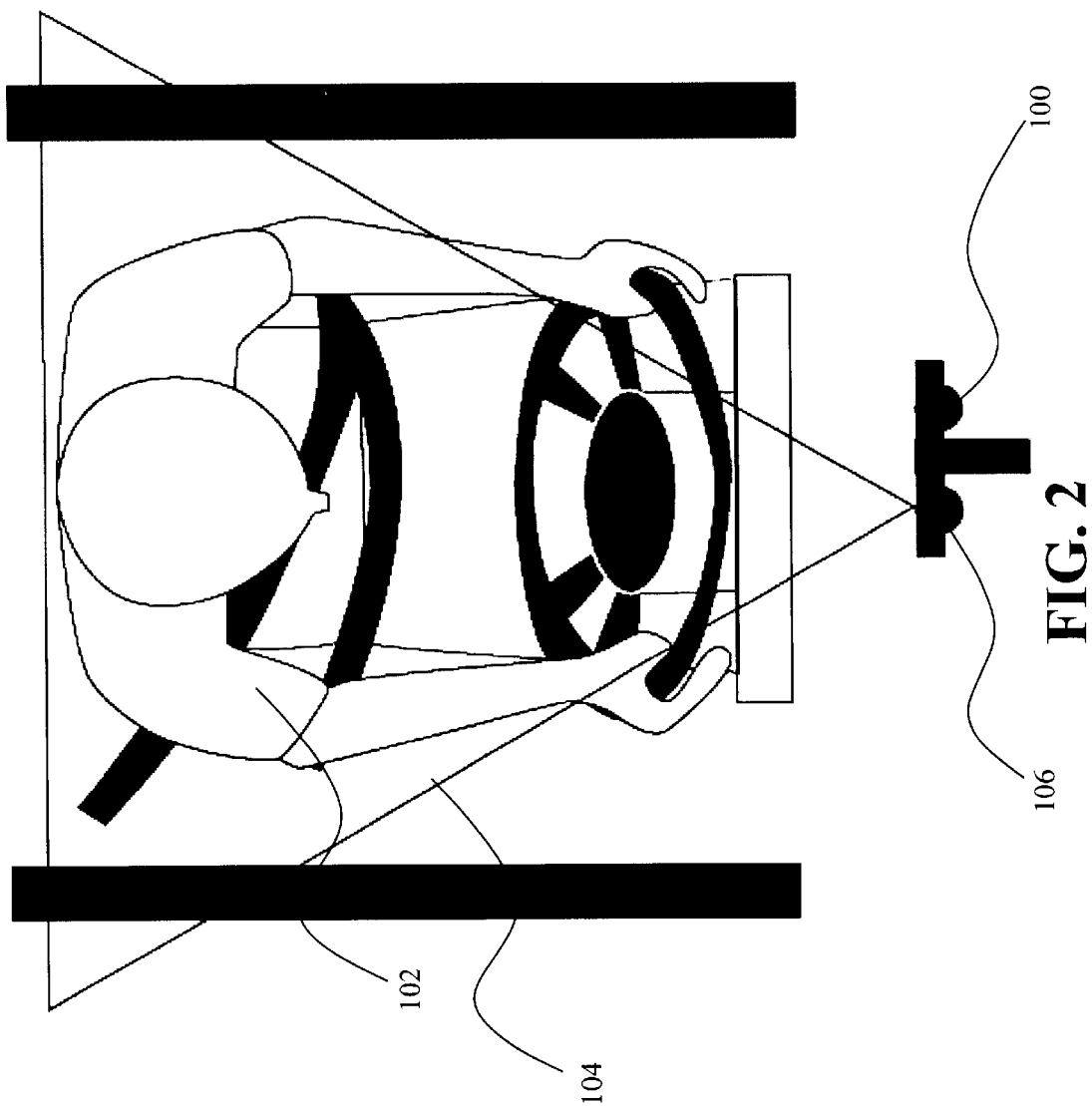
FIG. 2 is a cut-away top-view illustration of the present invention demonstrating the equipment configuration used with a seat of an automobile.

A cut-away top-view illustration of the embodiment of the invention shown in FIG. 1 is given in FIG. 2 with parts 100, 102, 104, and 106 corresponding to those of FIG. 1.

Figure 3:
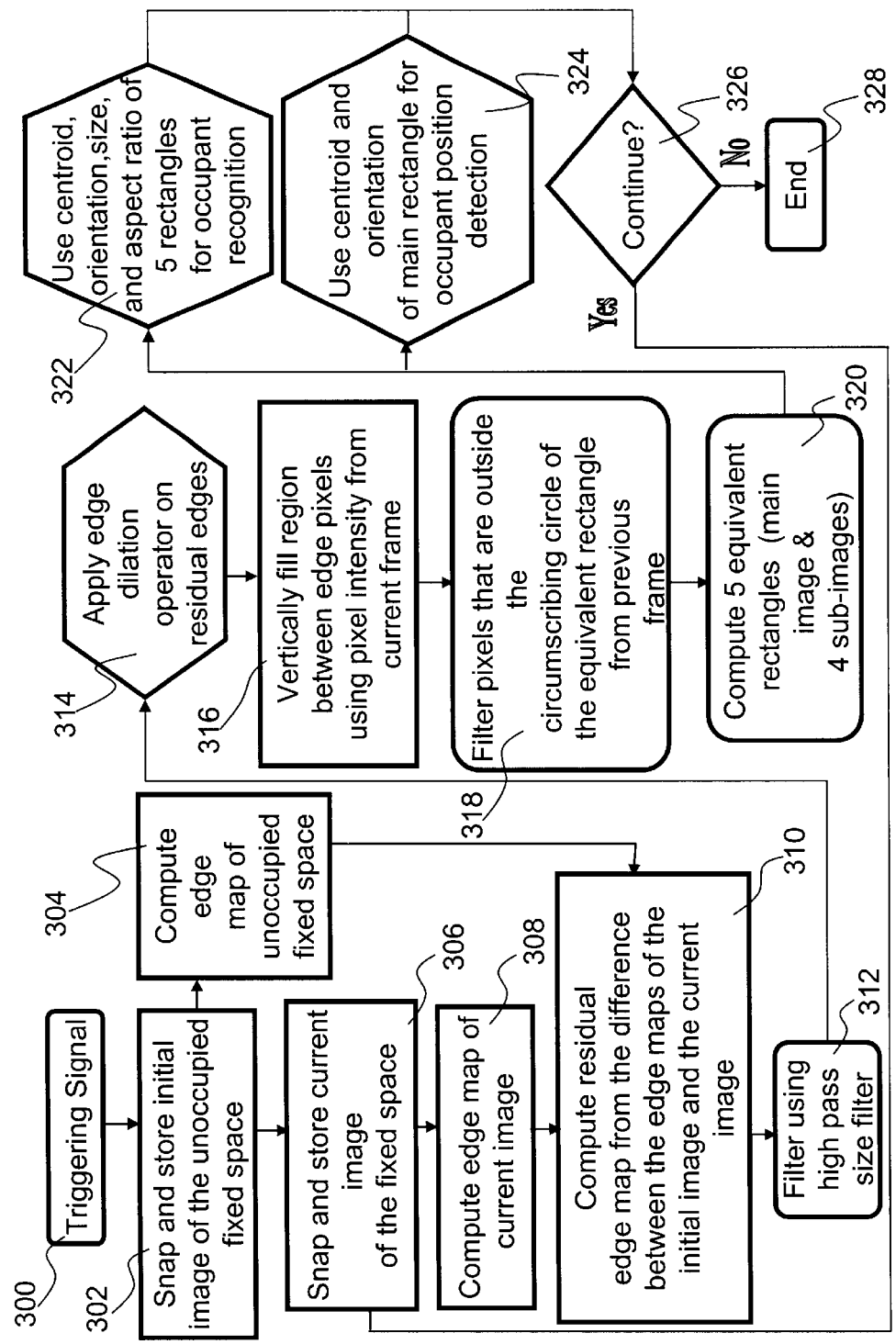
FIG. 3 presents a flowchart of the algorithm used for occupant recognition and tracking in the present invention.

A flowchart of the method used in the subsystem 108 of FIG. 1 and FIG. 2 for processing images from the camera is given in FIG. 3. Initially, the system is activated by a triggering signal, serving as the trigger 300 for the algorithm. The triggering signal causes the system to begin sampling and processing images, and may take such forms as the unlocking of a car door, the opening of a door to a room, or other indications that a fixed space is soon to be occupied. Once the triggering signal has activated the system, the initialization-imaging step 302 takes place, in which the camera 100 snaps and stores the initial image of the unoccupied fixed space 104. This image is processed in an initialization-edge-mapping step 304, in which the processing subsystem 108 computes an edge-map from the image of the unoccupied fixed space 104. Subsequent to the initialization-imaging step 302, and either subsequent to or overlapping with the initialization-edge-mapping step 304, the imaging step 306 occurs, during which the camera snaps and stores the current image of the fixed space 104, whether occupied or unoccupied. Next, in the edge-mapping step 308, the image from the imaging step 306 is processed in the processing subsystem 108 to compute an edge-map of the current image. After the computation of the edge-map from the edge-mapping step 308 is completed, a residual edge-map is computed from the difference between the edge-maps of the current estimate of the fixed space 104 (including any variations in illumination) and the current image in the residual edge-map computation step 310. In general, illumination effects remain constant in small, local neighborhoods in an image. Thus, up to this point in the method, the edges, which are a local property, have been extracted from an image consisting of a current estimate of the fixed space 104 and used as a basis for comparison with images consisting of the fixed space 104 with an occupant 102 via subtraction. This estimate is generated by replacing the occupant estimated from the previous frame with the corresponding portions of the initial image of the fixed space 104. This method incorporates changes in the current illumination into the current estimate of the fixed space, which results in more accurate cancellation of the fixed space in the current image.

Edges caused by shadows are usually more diffuse and less sharp than edges due to the occupant 102 or the fixed space 104. Thus, by using edge computation algorithms with parameters favoring sharp edges, the effects of shadows are reduced. The residual edge map computed in the residual edge-map computation step 301 predominantly contains the edges from the occupant. However, small edge fragments typically caused by noise in the camera must be removed. This removal process takes place in the next step, the high pass size filtering step 312, in which the size filter removes connected regions of the images which are smaller than a predetermined number of pixels. After the high pass size filtering step 312, the edges in the filtered residual edge map are dilated by an edge-dilation operator in an edge-dilation step 314. Thus, once the noisy edges, due to sensor noise and illumination changes, have been removed, the resulting edges are dilated to fill small gaps in the edge boundaries of the object. Next, in the vertical filling step 316, pixels within the edge dilated region are vertically filled using pixel intensity from the current frame. The vertically filled region between the edges is identified as the occupant 102. If, however, a high-contrast shadow with a sharp edge suddenly appears in the image, it can cause an edge to appear in the residual image. In order to remove these edges, the method makes use of the fact that the position of the occupant cannot change dramatically between two consecutively sampled images, provided the sensor frame rate is sufficiently high. If the edges in the current image are outside the circumscribing circle of the equivalent rectangle corresponding to the previous frame, they are removed by a peripheral filtering step 318. This makes the orientation and size of the moment image robust to illumination changes. The resulting image after the filtering step 318 contains the object segmented from its background. The object image is then binarized and its 2D image moments are computed. These moments are then used to construct an equivalent rectangle of the entire object that reflects the object's size, shape (in the form of an aspect ratio), position, and orientation. The centroid and orientation of this equivalent rectangle of the entire object can be used to detect the position of an occupant 102 within the fixed space 104 in an occupant position recognition step 324. In addition to the equivalent rectangle of the entire image, the segmented object image can also be partitioned into N subimages where the equivalent rectangle computation can be performed on each subimage to obtain N additional equivalent rectangles for each subimage. The N equivalent rectangles and the equivalent rectangles of the whole image total N+1 equivalent rectangles. N is chosen based on the resolution of the occupant 102 desired for a particular application. For example, in the case of an automobile safety system the occupant type recognition could include such classifications as small, medium, and large adult, forward facing child seat, rear-facing infant seat, etc. The classifications may be tailored to a particular use and the number of rectangles computed may be chosen to fit computation speed limitations. The centroid, orientation, size, and aspect ratio of the N+1 rectangles can be utilized in an occupant type recognition step 322. Note that the processing for the occupant type recognition step 322 and the occupant position recognition step 324 can be performed in parallel. Partitioning the image is advantageous because moment features can be calculated independently for regions likely to contain sub-features of the occupant 102 such as the arms, torso, and head in the case of a human occupant. The moment features for the N+1 rectangles can be computed in parallel. The position, orientation, aspect ratio, and size of all N+1 rectangles provides a rich set of features for recognizing the type of occupant and his position and orientation. Using this approach, the system is capable of reliably segmenting occupants 102 from the fixed space 104 under varying illumination conditions. In the case of "smart" airbag systems, the inventors have found a combination N=4 and partitioning into equal quadrants to provide a preferred result. However it is appreciated that different numbers for N and different partitioning schemes may be desirable depending on a particular application. After the occupant type and position recognition steps, 322 and 324 respectively, have been performed, the system checks for a continuation/discontinuation signal 326. The opening of a door or other suitably chosen indications that continual determination of occupant type and/or position is no longer necessary may trigger this signal. If the continuation/discontinuation signal 326 indicates that discontinuation is desired, the algorithm will terminate 328. If the continuation/discontinuation signal 326 indicates that continuation is desired, the algorithm will loop to the imaging step 306 and will repeat. Note that the continuation/ discontinuation signal 326 may take the form of an affirmative signal to continue or continuation may be assumed until an affirmative signal to discontinue is generated. The particular nature of the signal may be suitably chosen for a particular application.

Several experiments have been performed to test the method of FIG. 3 in the context of "smart" airbag systems. A summary of the results is given in FIGS. 4a, 4b, 4c, 5a, 5b, 5c, 6a, 6b, 6c, and 6d. FIGS. 4a, 4b, 5a, 5b, 6a, 6b, and 6c each provide a set of six subimages with FIGS. 4c, 5c, and 6d providing interpretive keys to FIGS. 4a and 4b; FIGS. 5a and 5b; and FIGS. 6a, 6b, and 6c, respectively. As demonstrated in each of the interpretive keys of FIGS. 4c, 5c, and 6d, the image in the upper left of each of the sets of six sub-images represents a 64×48 pixel input image including an occupant 102 and the fixed space 104. This corresponds to the image used in the imaging step 306 of FIG. 3. The image in the upper right represents a 64×48 pixel image corresponding to the current estimate of the unoccupied fixed space 104. This image consists of the current input image but with those portions corresponding to the occupant in the last frame replaced with corresponding portions of the image used in the initialization-imaging step 302 of FIG. 3. The image in the middle left represents a 64×48 pixel image of the edge map resulting from the residual edge map computed in the residual edge-mapping step 310 of FIG. 3. The image in the middle right represents an extracted image of the occupant 102 after dilation in the edge-dilation step 314 of FIG. 3. The image in the lower left position represents the object mask after size filtering in the high pass size filtering step 312 of FIG. 3. The image in the lower right position represents a set of five equivalent rectangles computed in the rectangle computing step 320 of FIG. 3 in order to track the occupant 102.

Utilizing the key developed in the previous paragraph for interpreting the six sub-images, following is a description of each of the image groups. FIG. 4a and 4b present results for occupant position detection with FIG. 4a providing data based on an adult male in an upright position and FIG. 4b providing data based on an adult male leaning forward, close to the instrument panel of an automobile. FIG. 5a and 5b present results for the method of FIG. 3 in response to two different illumination conditions, with FIG. 5a providing data based on normal ambient lighting conditions and FIG. 5b providing data based on bright lighting applied to simulate sunshine. In both cases, the occupant 102 was removed from the input image and replaced with the stored fixed space, resulting in the updated fixed space estimate. FIG. 6a, 6b, and 6c present results for occupant type recognition with FIG. 6a providing data based on the case of an adult in an upright position, FIG. 6b providing data based on the case of a child in an upright position, and FIG. 6c providing data in the case of a rear facing infant seat. Note that the feature set, including the centroid, size, and orientation of the five computed rectangles in each of the three cases, are significantly different and can easily be used for discrimination among the three classes.

Figure 7:
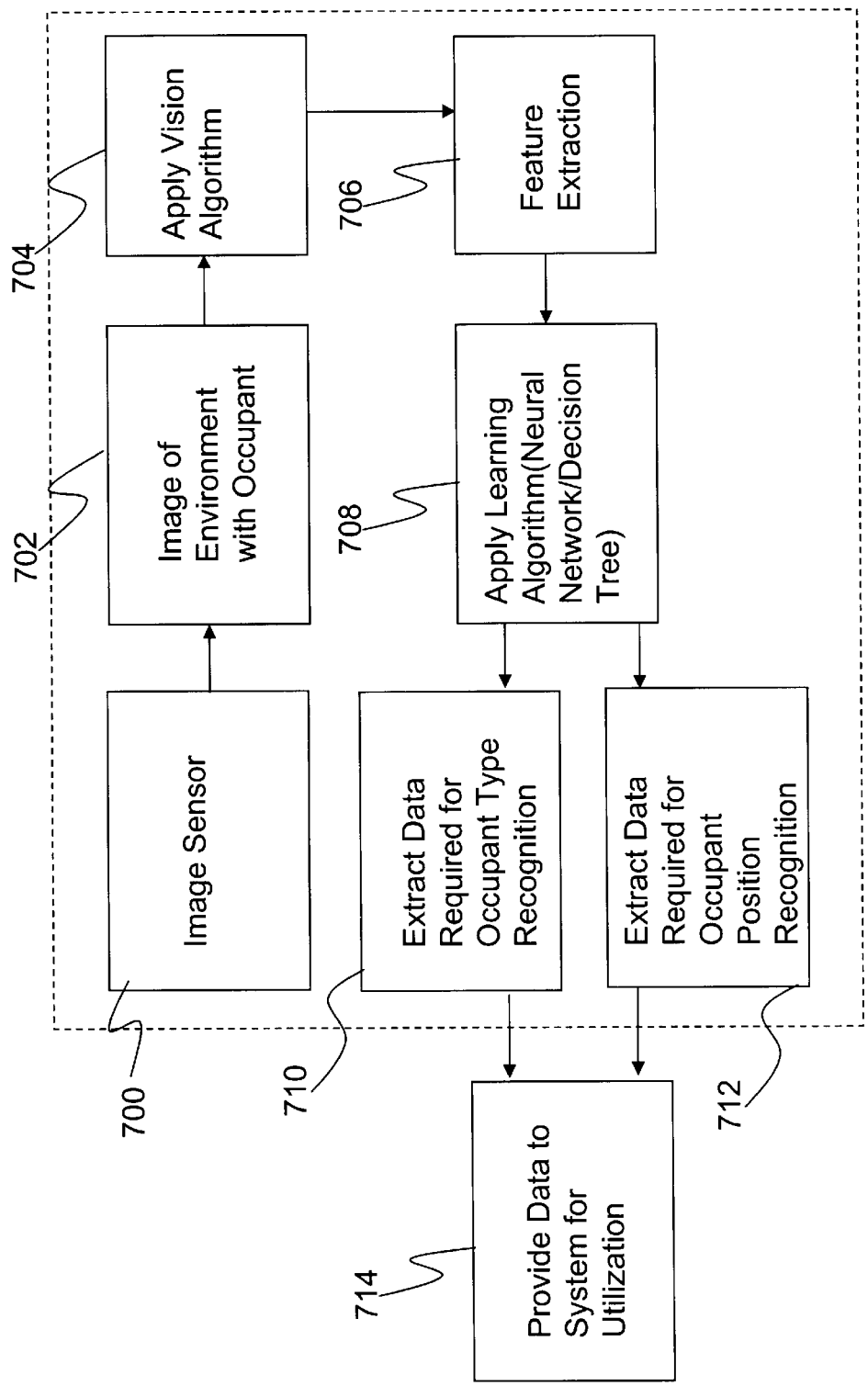
FIG. 7 is a block diagram depicting the operations performed by the present invention.

A general overview of the computer vision system in its preferred embodiment as a learning system is shown in FIG. 7 using the configuration of FIGS. 1 and 2 with the method of FIG. 3. In this embodiment, an image sensor 700 generates the initial image of the fixed space 104 and subsequent images of the occupant 102 and fixed space 104 for comparison, as discussed above per FIG. 3. These generated images 702 are used with the vision algorithm 704, shown in detail in FIG. 3 for feature extraction 706 to extract the characteristics required for occupant type and position determination. A learning algorithm 708 utilizes the extracted characteristics to implement the system's recognition capabilities. Learning algorithms such as neural networks and decision tree algorithms suitable for this purpose are well known in the art. One resource discussing such networks is Backpropagation Neural Networks, by D. Rumelhart and J. Maclelland, published by MIT Press, Cambridge, Mass. 1986. A learning algorithm allows the system to improve its occupant recognition over time, and can be used to develop a highly reliable system. After application of a learning algorithm, the decision results for occupant type recognition 710 and for occupant position recognition 712 are extracted. This information is then provided for utilization by a system 714 such as an automotive safety system which decides whether, and how, to deploy a safety restraint, e.g. an airbag.

What is claimed is:

1. A computer vision apparatus for recognizing and tracking occupants in a fixed space including:
    at least one sensor fixedly positioned to capture light from a fixed space beginning at a time prior to an occupant's entrance and continuing subsequent to an occupant's entrance to form a series of N images having pixels with pixel intensities, the series of N images including a current image $N_c$ and a previous image $N_{c-1}$, with the previous image $N_{c-1}$ being the image immediately prior to the current image $N_c$ in the series of N subsequent images, the sensor converting the series of N images into electronic data;
    a processor positioned to receive electronic data from the sensor and to compare the current image $N_c$ with the previous image $N_{c-1}$ in order to dynamically determine the occupant type and occupant position;
    computing an low-level vision-based feature map of the previous image $N_{c-1}$ of the fixed space;
    computing an low-level vision-based feature map of the current image $N_c$ of the fixed space;
    computing a residual low-level vision-based feature map having connected regions withsizes, by calculating the difference between low-level vision-based feature map of the current image $N_c$ of the fixed space and the previous image $N_{c-1}$ of the fixed space, where the pixels corresponding to the occupant in the previous subsequent image have been replaced by corresponding pixels of the current image $N_c$ of the fixed space;
    applying a high pass size filter to remove connected regions of the residual low-level vision-based feature map below a specified size, resulting in a size-filtered residual low-level-vision-based feature map including gaps and a bounded area;
    filling the bounded area of the size-filtered residual low-level vision-based feature map, resulting in a filled low-level vision-based feature area;
    calculating two-dimensional moments of the filled low-level vision-based feature area and using the two-dimensional moments to construct an equivalent rectangle with moments equal to that of the filled low-level vision-based feature area; and
    determining the centroid, orientation, size and aspect ratio of the equivalent rectangle.

2. A computer vision apparatus for recognizing and tracking occupants in a fixed space as set forth in claim 1, further including at least one illumination source fixedly positioned to provide illumination to the fixed space and an occupant therein.

3. A computer vision apparatus for recognizing and tracking occupants in a fixed space as set forth in claim 2, wherein the illumination source is an IR source.

4. A computer vision method for recognizing and tracking occupants in a fixed space including the steps of:
  (a) providing at least one sensor fixedly positioned to capture light reflected from a fixed space beginning at a time prior an occupant's entrance and continuing subsequent to an occupant's entrance to form a series of N images having pixels with pixel intensities, the series of N images including a current image $N_c$ and a previous image $N_{c-1}$, with the previous image $N_{c-1}$ being the image immediately prior to the current image $N_c$ in the series of N subsequent images, the sensor converting the series of N images into electronic data; and
  (b) processing the electronic data with a processing system positioned to receive electronic data from the sensor and to compare current image $N_c$ with the previous image $N_{c-1}$ in order to dynamically determine the occupant type and occupant position.

5. A computer vision method for recognizing and tracking occupants in a fixed space as set forth in claim 4 wherein the processing step (b) further includes the steps of:
  (a) computing an edge map of the previous image $N_{c-1}$ of the fixed space;
  (b) computing an edge map of the current image $N_c$ of the fixed space;
  (c) computing a residual edge map having connected regions with sizes, by calculating the difference between edge map of the current image $N_c$ of the fixed space and the previous image $N_{c-1}$ of the fixed space, where the pixels corresponding to the occupant in the previous subsequent image have been replaced by corresponding pixels of the current image $N_c$ of the fixed space;
  (d) applying a high pass size filter to remove connected regions of the residual edge map below a specified size, resulting in a size-filtered residual edge map including gaps and a bounded area;
  (e) filling the bounded area of the size-filtered residual edge map, resulting in a filled edge area;
  (f) calculating two-dimensional moments of the filled edge area and using the two-dimensional moments to construct an equivalent rectangle with moments equal to that of the filled edge area;
  (g) determining the centroid, orientation, size, and aspect ratio of the equivalent rectangle.

6. A computer vision method for recognizing and tracking occupants in a fixed space as set forth in claim 5, wherein the sensors include onboard edge extraction and two-dimensional moment computation capability.

7. A computer vision apparatus for recognizing and tracking occupants in a fixed space as set forth in claim 1 wherein the processing system utilizes the method of claim 6.

8. A computer vision method for recognizing and tracking occupants in a fixed space as set forth in claim 6 wherein the filling step (e) further includes the steps of:
  (a) applying an edge dilation operator to the size-filtered residual edge map to dilate the size-filtered residual edge map to eliminate gaps, resulting in a dilated residual edge map including edge pixels and a bounded area; and
  (b) vertically filling the area between the edge pixels in the dilated residual edge map using the pixel intensity from the subsequent images resulting in a filled edge area.

9. A computer vision method for recognizing and tracking occupants in a fixed space as set forth in claim 7, further including the steps of:
  (a) partitioning the filled edge area into a plurality N of sub-filled edge areas;
  (b) calculating two-dimensional moments of each of the N sub-filled edge areas and using the two dimensional moments to construct an equivalent rectangle for each of the N sub-filled edge areas; and
  (c) determining centroid, orientation, size, and aspect ratio of each of the equivalent rectangles for each of the N sub-filled edge areas.

10. A computer vision method for recognizing and tracking occupants in a fixed space including the steps of:
  (a) providing at least one sensor fixedly positioned to capture light reflected from a fixed space beginning at a time prior to an occupant's entrance and continuing subsequent to an occupant's to form a series of N images having pixels with pixel intensities, the series of N images including a current image $N_c$ and a previous image $N_{c-1}$, with the previous image $N_{c-1}$ being the image immediately prior to the current image $N_c$ in the series of N subsequent images, the sensor converting the series of N images into electronic data; and
  (b) processing the electronic data with a processing system positioned to receive electronic data from the sensor and to:
    i. compute an edge map of the previous image $N_{c-1}$ of the fixed space;
    ii. compute an edge map of the current image $N_c$ of the fixed space;
    iii. compute a residual edge map having connected regions with sizes, from the difference between the edge map of the current image $N_c$ of the fixed space and the previous image $N_{c-1}$ of the fixed space, where the pixels corresponding to the occupant in the previous subsequent image have been replaced by corresponding pixels of the current image $N_c$ of the fixed space;
    iv. apply a high pass size filter to remove connected regions of the residual edge map below a specified size, resulting in a size-filtered residual edge map including gaps;
    v. apply an edge dilation operator to the size-filtered residual edge map to dilate the size-filtered residual edge map to eliminate gaps, resulting in a dilated residual edge map including edge pixels;
    vi. vertically fill the area between the edge pixels in the dilated residual edge map using the pixel intensity from the subsequent images resulting in a filled edge area;
    vii. calculate two-dimensional moments of the filled edge area and using the two-dimensional moments to construct an equivalent rectangle with moments equal to that of the filled edge area;
    viii. determine the centroid, orientation, size, and aspect ratio of the equivalent rectangle;
    ix. partitioning the filled edge area into a plurality N of sub-filled edge areas;
    x. calculating the two-dimensional moments of each of the N sub-filled edge areas and using the two dimensional moments to construct an equivalent rectangle for each of the N sub-filled edge areas; and
    xi. determining the centroid, orientation, size, and aspect ratio of each of the equivalent rectangles for each of the N sub-filled edge areas; and
  (c) providing the centroid, orientation, size, and aspect ratio of the equivalent rectangle and the centroid, orientation, size, and aspect ratio of each of the equivalent rectangles for each of the N sub-filled edge areas as output.

11. A computer vision method for recognizing and tracking occupants in a fixed space as set forth in claim 3, further including the steps of:
 (a) repeating steps (a) to (h) of claim 5 a plurality of times;
 (b) computing the circumscribing circle of the equivalent rectangle during each repetition;
 (c) comparing the filled edge area generated during the current repetition with the circumscribing circle of the equivalent rectangle computed during the previous repetition; and
 (d) removing that part of the filled edge area falling outside the circumscribing circle the step of calculating the two-dimensional moments of the filled edge area and using the two-dimensional moments to construct an equivalent rectangle.

12. A computer vision apparatus for recognizing and tracking occupants in a fixed space as set forth in claim 1, wherein the low-level vision-based features are edges.

* * * * *

UNITED STATES PATENT AND TRADEMARK OFFICE
CERTIFICATE OF CORRECTION

| | | |
|---|---|---|
| PATENT NO. | : 6,608,910 B1 | Page 1 of 1 |
| APPLICATION NO. | : 09/389874 | |
| DATED | : August 19, 2003 | |
| INVENTOR(S) | : Narayan Srinivasa and Yuri Owechko | |

It is certified that error appears in the above-identified patent and that said Letters Patent is hereby corrected as shown below:

Column 8, line 18, insert the text --reflected-- in between the text "light" and "from."

Signed and Sealed this

Twenty-second Day of May, 2007

JON W. DUDAS
*Director of the United States Patent and Trademark Office*